United States Patent [19]
Carlson et al.

[11] Patent Number: 5,348,651
[45] Date of Patent: Sep. 20, 1994

[54] MEMBRANE SIMULATOR

[75] Inventors: Timothy J. Carlson, Litchfield, Conn.; Richard D. Geiger, Cedarburg, Wis.; Gerald A. Karls, Greenfield, Wis.; Bruce A. Meysembourg, Adell, Wis.

[73] Assignee: Aqua-Chem, Inc., Milwaukee, Wis.

[21] Appl. No.: 35,670

[22] Filed: Mar. 23, 1993

[51] Int. Cl.$^5$ ............................................. B01D 35/12
[52] U.S. Cl. ...................... 210/321.6; 210/323.1; 210/433.1; 210/450; 210/455; 210/490
[58] Field of Search .............. 210/321.6, 323.1, 433.1, 210/450, 455, 490; 55/298, 301

[56] References Cited

U.S. PATENT DOCUMENTS

| | | |
|---|---|---|
| 3,542,204 | 11/1970 | Clark . |
| 3,581,900 | 6/1971 | Clark . |
| 3,666,109 | 5/1972 | Goeldner . |
| 3,708,069 | 1/1973 | Clark . |
| 3,716,143 | 2/1973 | Clark . |
| 3,737,043 | 6/1973 | Clark . |
| 4,814,079 | 3/1989 | Schneider . |

*Primary Examiner*—Robert A. Dawson
*Assistant Examiner*—W. L. Walker
*Attorney, Agent, or Firm*—Whyte Hirschboeck Dudek

[57] ABSTRACT

Device to simulate operation and placement of a reverse osmosis membrane element in a Reverse Osmosis Water Purification Unit (ROWPU). The device simulates the drop in hydrostatic pressure occurring when a liquid (usually water) is forced across a membrane which separates different concentrations of solutes in the same solvent system. When substituted into a typical ROWPU for an actual reverse osmosis (RO) element, the drop in hydrostatic pressure is effected by an aperture or series of apertures which allow passage of liquid directly from the intake liquid piping to the purified effluent piping. The hydrostatic pressure of the waste effluent is similar to the pressure present in the waste effluent when an actual RO element is operating in a ROWPU.

6 Claims, 4 Drawing Sheets

MEMBRANE SIMULATOR

BACKGROUND OF THE INVENTION

Increasing demand for pure water has resulted in considerable effort to develop economical methods and apparatus for purifying water and industrial solvents. The discharge of industrial waste into freshwater ecosystems and increasing human activity along ocean coastlines void of freshwater, has resulted in construction of water purification systems for removing organic wastes and inorganic ions, such as salts, in order to make available water potable. These systems and associated apparatus are readily adaptable to provide drinkable water from sources such as dirty fresh water, brackish water (dirty with a little salt), sea water (very salty) or fresh water containing nuclear, biological or chemical (NBC) agents. It is convenient to incorporate the use of reverse osmosis into these water purification systems.

If a semi-permeable membrane wherein only water, but not salt molecules may pass, is placed between solutions of different osmotic pressure, water will flow through the membrane from the region of the lower osmotic pressure to the higher. However, if pressure is applied to the region of higher osmotic pressure which equals or exceeds the osmotic pressure, water will flow across the membrane from the region of higher osmotic pressure to the lower region. This is the process of reverse osmosis.

In order to purify the water to be treated by reverse osmosis, a liquid mixture, including solutions, slurries or colloidal suspensions, is placed into contact with a semi-permeable membrane while being subjected to a pressure in excess of the osmotic pressure of the liquid mixture. For a typical concentration of salt in seawater, the osmotic pressure is on the order of 350 pounds per square inch. Accordingly, an osmotic potential in excess of that amount must be maintained across the membrane. It is not unusual for osmotic membranes to be subject to pressures in the order of 1000 pounds per square inch. Many methods of supporting the membrane have been developed, including those incorporating the use of non-high pressure tolerant materials. However, one property is the same for all systems which incorporate reverse osmosis: a variance in hydrostatic pressure across the membrane.

The operation of a typical water purification operation capable of supplying upwardly of 40,000 gallons of potable drinking water daily involves the cooperation of multiple purification systems. First, large particulate matter must be removed from the intake water, in order to prevent such particular from clogging, damaging or otherwise interfering with the efficient operation of subsequent systems. Such devices may include strainers, filters, centrifugal separators, etc. In addition, the intake water may be treated with various chemical precipitators and anti-bacterial agents. The intake water must be carefully cleansed, purified and treated prior to application of reverse osmosis not only to ensure to sufficiently potable water, but also to prevent premature destruction of the osmotic membrane.

One currently popular water purification system incorporating reverse osmosis is packaged together as a self-contained, portable unit. Such devices, sometimes known as Reverse Osmosis Water Purification Units (ROWPU) are particularly useful for temporary settlements and remote locations where potable water is not readily available. Individuals intended to operate these devices are usually subjected to a training period, including actual device operation, usually prior to operating the devices in an actual production environment. Therefore the membranes are subjected to unnecessary operation which reduces useful life and may even result in membrane damage. Also, osmotic membranes removed from their protective shipping packages must be properly protected and contained if not in use or they will be subject to severe performance degradation and deterioration and may become totally unusable. Since osmotice membranes are relatively fragile and expensive, this not only increases the cost of operating a typical ROWPU, but could be disastrous in remote locations where replacement parts are not immediately available. As a result, a device which could simulate the actual operation of an osmotic membrane in a ROWPU, and is easily interchangeable with an actual membrane would allow effective training of operating personnel as well as minimizing accidental damage or destruction of the membrane and eliminate the need to protectively store membranes used for training if equipment is not immediately placed into potable water production.

SUMMARY OF THE INVENTION

It is the principal object of the invention to provide a device which can simulate the pressure drop occurring across a semi-permeable membrane and maintain the required system flow rates during the process of reverse osmosis. The invention accomplishes this by providing at least one perforation or aperture in an elongated tubular member dimensioned to simulate the configuration of an actual membrane or series of coaxial membrane units, and also to simulate the pressure drop associated with a simulated unit and to provide the path for the required flow of product.

It should be understood that the present invention may be constructed to approximate variations in simulated pressure to accommodate virtually any combination of solutes, solute concentration and operating pressure. The perforation(s) may be pre-drilled at the factory or may be field constructed with inexpensive portable tools at the operating situs of the ROWPU. Situs drilling may provide the advantage of better approximation of actual operating conditions.

The primary utility of the invention is for training personnel in the operation, maintenance and reconditioning of a ROWPU. This can include installation and disassembly. Since a typical ROWPU involves the cooperative effort of several purification systems, all linked systems must function in order for the unit to be effective; just as all links must hold in order for an entire chain to secure. Because the present invention simulates the drop in pressure of an operating reverse osmosis (RO) element in a ROWPU and provides the required system flow rates, it also allows for testing and calibration of other systems of the ROWPU. The invention may be used whenever it is necessary to approximate the drop in pressure and maintain flow rates which occur when an osmotic membrane is used, but conditions are such that the risk of damage to the membrane is present.

The simulating perforations may also be present in a plurality and may be of varying diameter capable of being plugged individually by any means suitable, so as to better approximate the actual drop in hydrostatic pressure.

The invention may take the form of multiple embodiments. These embodiments include an integral simulator which comprises a tubular shape that is co-extensive with the length of a pressure vessel into which it is substituted for a reverse osmosis element. The membrane simulator of this invention may also comprise separable elements, allowing for installation in the event that end-wise access to the ROWPU is obstructed.

DETAILED DESCRIPTION OF THE DRAWINGS

Structure

Figure 1:
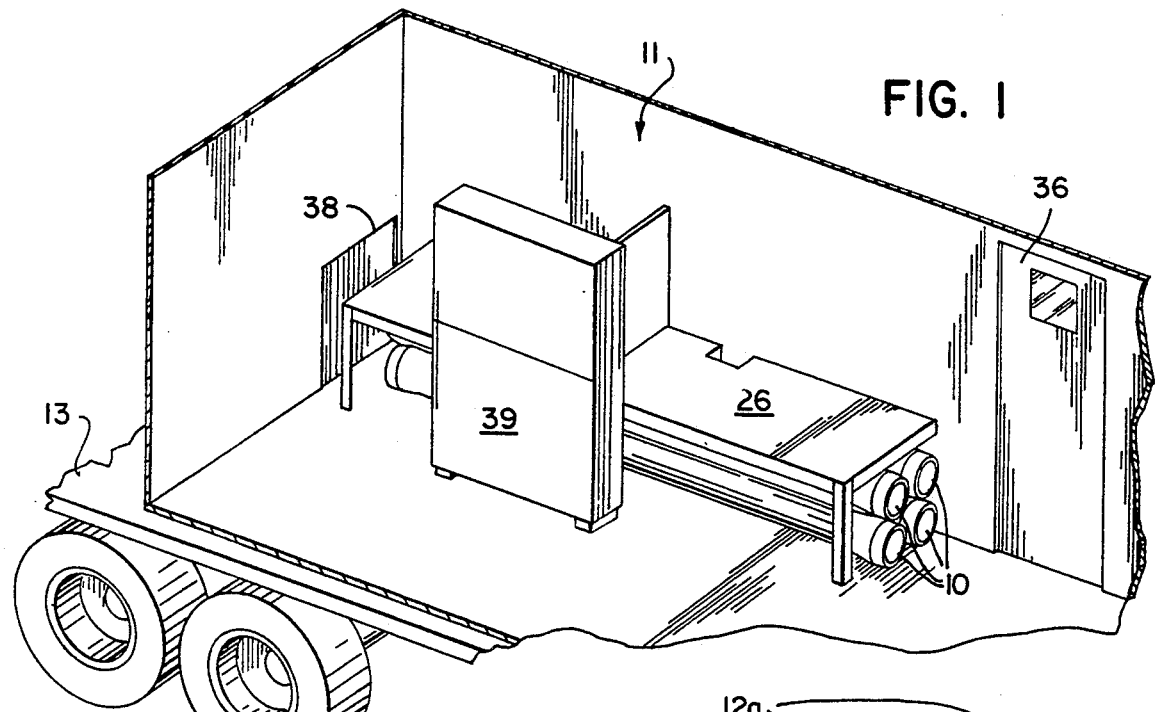
FIG. 1 is a general perspective, cut-away view illustrating conventional reverse osmosis pressure vessels positioned in operating position within a typical ROWPU installed in a transportable trailer vehicle.

Referring now to the drawings, FIG. 1 illustrates a bank of several conventional tubular reverse osmosis (RO) pressure vessels, 10 in a typical configuration of a Reverse Osmosis Water Purification Unit (ROWPU) 11. The unit is depicted in a transportable van or a trailer 13. Omitted for clarity from FIG. 1 is intake and outflow piping used in the purification of water, and the connection to other components of the ROWPU system. It is usual to provide a table 26, filters 37, a main control panel 39, side access doors 36 and an end access panel 38.

Figure 2A:
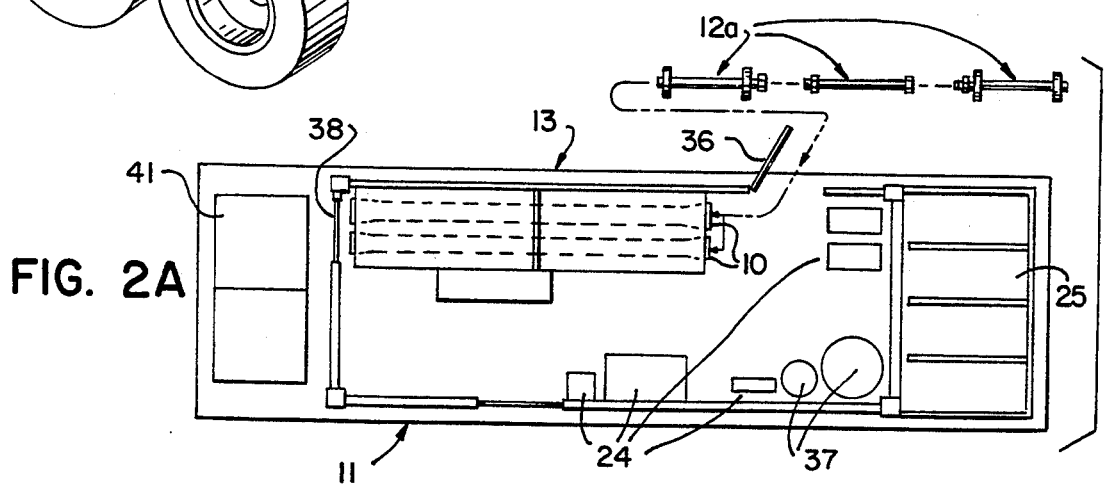
FIG. 2A is a top plan, cut-away view of the vehicle of FIG. 1, further illustrating an arrangement and technique for substituting one embodiment of a reverse osmosis simulator of this invention into a typical ROWPU, wherein an end access door is obstructed due to the presence of an accessory member such as a portable generator unit, in which the embodiment comprises three separable components.

The top plan view of FIG. 2A diagrammatically illustrates one method of substituting a conventional RO membrane or series of membranes (not shown) with a membrane simulator 12a formed from three separably coupled tubular units. The membrane simulator 12a may be disassembled into at least 3 smaller units to facilitate movement into and out of the ROWPU 11 when entry is required via the side access door 36. The embodiment permits entry without requiring any modification or displacement of a conventionally positioned door, or of any other equipment conventionally disposed in the vehicle 13. The separably formed embodiment of the membrane simulator 12a is preferred when the end access door 38 is obstructed by structural accessories, such as a portable generator set 41. Also depicted is auxiliary operating equipment 24 and a high pressure pump system unit 25, as is usually provided in a typical ROWPU.

Figure 2B:
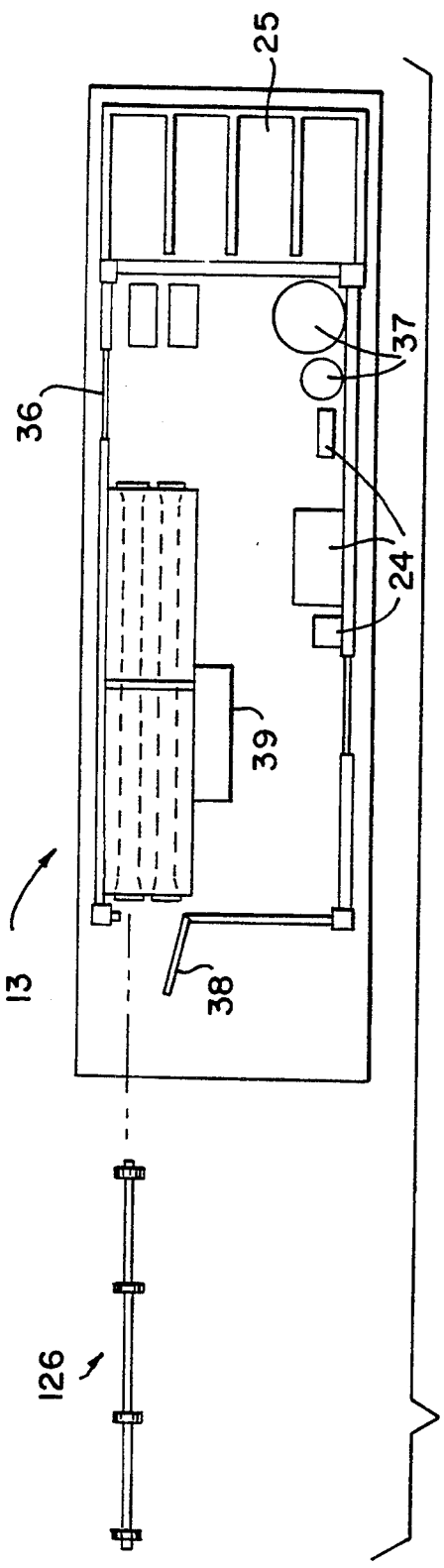
FIG. 2B is a view similar to the view of FIG. 2A, but illustrating an arrangement and a technique for substituting into a ROWPU with an unobstructed end access door, another embodiment of the reverse osmosis simulator of this invention, in which the embodiment comprises an integrally formed unit.

FIG. 2B diagrammatically illustrates an arrangement for substitution of a conventional RO membrane or series of membranes (not shown) with an integrally formed membrane simulator 12b comprising a single, integrally formed unit. This embodiment may be positioned in the ROWPU units 11 by means of end access door 38. The integrally formed embodiment may be used when there is no obstruction of the end access door 38, such as by the motor generator set 41 (FIG. 2A).

Figure 5B:
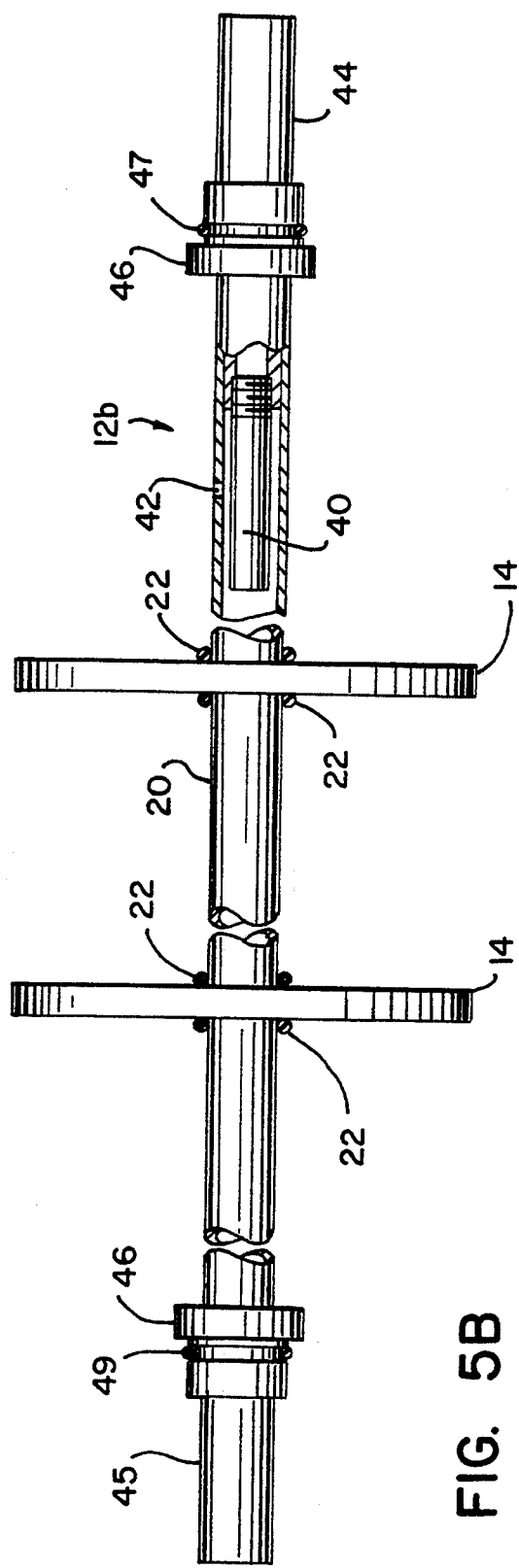
FIG. 5B is a side elevational view exhibiting in detail the components of the pressure simulator of FIG. 3A, wherein the embodiment is an integral unit.
Figure 3A:
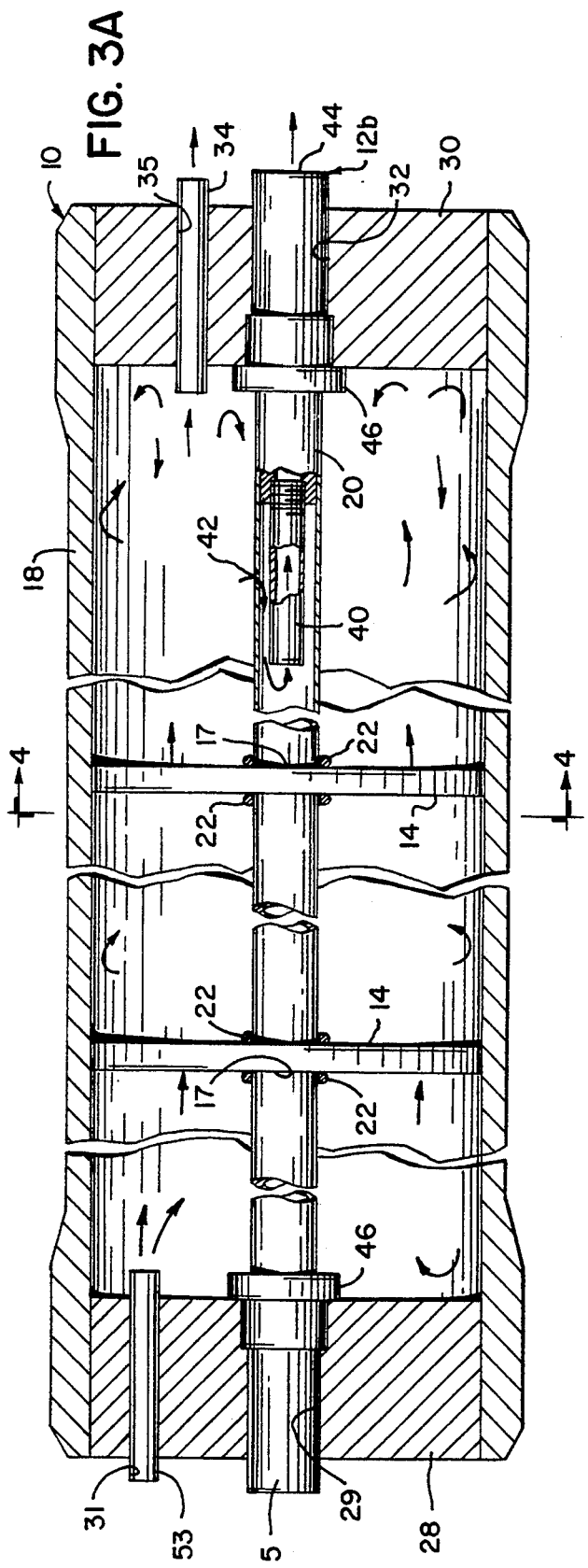
FIG. 3A is a longitudinal sectional view illustrating a casing or vessel for receiving a conventional osmosis membrane, but containing an integrally formed embodiment of the present invention positioned to substitute for and temporarily replace the membrane.
Figure 5C:
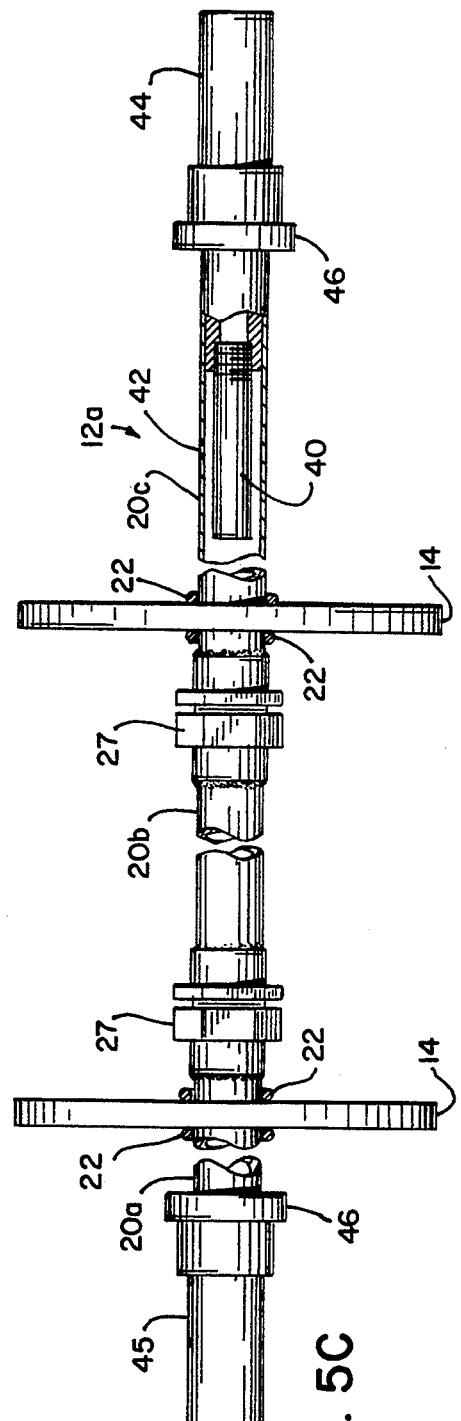
FIG. 5C is a view similar to the view of FIG. 5B except illustrating an embodiment of the invention as three separable units.

For the purposes of the following discussion describing the structure and operation of the pressure vessel 10 in FIG. 3A, even though the embodiment described in FIG. 3A depicts the integrally formed membrane simulator 12a shown individually in FIG. 5B, it should be understood that the separably formed membrane simulator 12a shown individually in FIG. 5C may also be inserted into pressure vessel casing 18.

In FIG. 3A, the integrally formed membrane simulator 12b is shown placed inside a conventional pressure vessel casing 18, for simulating a reverse osmosis unit of a typical ROWPU. This simplified simulator construction permits rough handling by inexperienced operators during training exercises and for adjusting and calibrating equipment to fit prescribed parameters. Axially spaced support members 14 (see also FIGS. 4 and 6) are constructed of material, such as plastic, and molded to support an interior tube 20 which maintains necessary flow rate compatible with the volume entering via the aperture 42 located interiorly of and coaxial with the pressure vessel casing 18. The support members 14 are apertured at 15 to receive the interior tube 20. Elastic O-rings 22 are located at opposite sides of the support member 14, to provide means for positioning and retaining each support member 14 onto the outer surface of interior tube member 20. An intake cap head 28 apertured at 29 to support interior tube 20 and an intake hollow tube insert number 45. Intake O-rings 49 seals intake cap head 28 to intake hollow tube insert member 45 to prevent passage of liquid. The intake cap head 28 also contains an aperture 31 for receiving an intake pipe stub 33. The opposite end of the interior tube 20 is supported by both a coaxial aperture 32 in outflow cap head 30, and by an outflow hollow tube insert member 44 to prevent the passage of liquid. The interior tube 20 is provided with a pressure simulator aperture 42, as more clearly seen in FIG. 5A.

The embodiment 12b of FIG. 5B illustrates an integrally formed membrane simulator comprising the interior tube 20, supported by an aperture in the support members 14 and positioned on interior tube 20 by O-rings 22. Also shown is the intake and outflow hollow tube insert members 45 and 44 respectively, and intake and outflow O-rings 49 and 47, respectively, as well as collar ring 46.

The embodiment 12a of FIG. 5C illustrates a separably formed membrane simulator comprising a three-piece interior tube 20a, 20b, and 20c which are joined co-axially and securely by way of coupling elements 27. Although FIG. 5C displays only two coupling elements 27 and a three piece interior tube 20a, 20b, and 20c, it should be understood that the invention encompasses greater and lesser multiples of these coupling elements. Also shown on the intake and outflow hollow tube insert members 45 and 44 respectively, are the intake and outflow O-rings 49 and 47, respectively, as well as collar ring 46.

Figure 4:
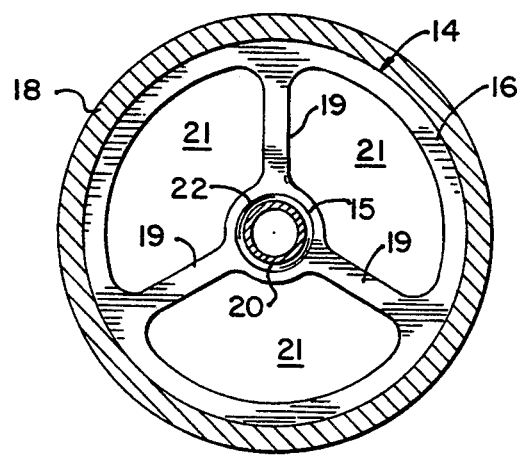
FIG. 4 is a cross-sectional view taken along line 4—4 of FIG. 3A, illustrating an embodiment of a structural support member with radially spaced spokes.
Figure 5A:
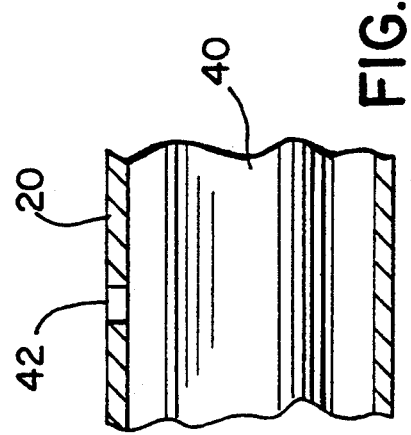
FIG. 5A is an enlarged, partial cut-away side view illustrating in detail the pressure simulator aperture illustrated in FIGS. 3A, 5B and 5C.

The embodiment of FIG. 4 illustrates a support member 14 having an annular configuration with an inner hub 15, and an outer annular rim 16, and with internally formed, radially spaced support spokes 19 terminating at their opposite ends in the outer annular rim 16 and the inner hub 15. Fluid flow apertures 21 (see FIG. 4) are defined by the outer annular rim 16, the inner hub 15 and radial support struts 19. The components of the support member 14, including the inner hub 15, the radial support spokes 19 and the outer annular rim 16 may be molded to form an integral unit. The fluid flow apertures 21 must be of sufficient cross-sectional area so as not to unduly restrict the flow of liquid through pressure vessel 10.

Figure 6:
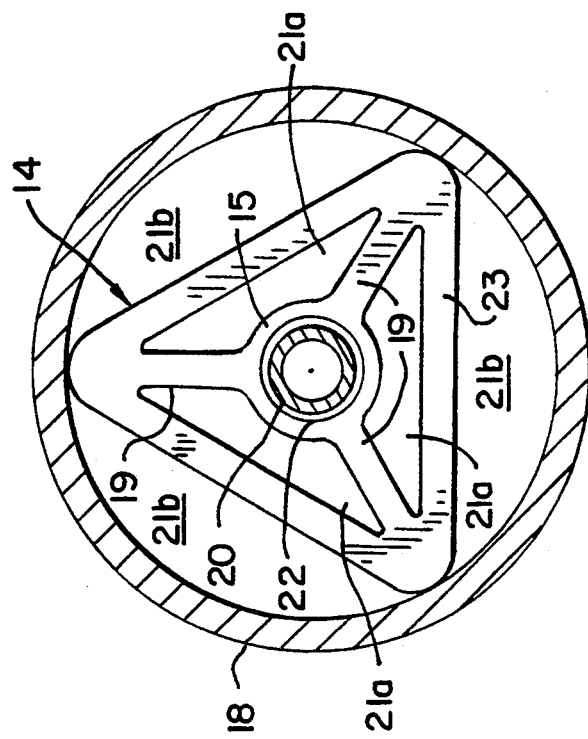
FIG. 6 is a cross-sectional view taken in the plan of FIG. 4, illustrating another embodiment of the structural support member and having a generally triangular configuration.

In the embodiment of FIG. 6, a support member 14 defines a triangular configuration with an inner hub 15, a polygonal rim 23 and internally formed, radially spaced support spokes 19 terminating at their opposite ends in the polygonal rim 23 and the inner hub 15. The components of the support member 14, including the inner hub 15, the radial support spokes 19 and the polygonal rim 23 may be formed to provide an integral unit. Inner and outer fluid flow apertures 21a and 21b, respectively, (see FIG. 6) are defined by the volume circumscribed by the pressure vessel casing 18, the inner hub 15, the radial support spokes 19 all from which the volume occupied by the polygonal rim 23 is subtracted. The fluid flow apertures 21a and 21b must be of sufficient cross-sectional area so as not to unduly restrict the flow of liquid through pressure vessel 10.

Referring now to FIG.'s 3A, 5A, 5B and 5C, a deflector pipe 40 is coaxially positioned with a portion lying beneath the pressure simulator aperture 42. The deflector pipe 40 is threadably received and supported by the outflow hollow tube insert member 44. The outflow hollow tube insert member 44 slidably receives on end of the interior tube 20. A collar ring 46 is positioned at each end of the interior tube 20 and the outflow and intake hollow tube insert members 44 and 45, respectively, to act as a stop during insertion of the respective cap heads 28 and 30 into the interior tube 20. When the pressure vessel 10 is connected in series with other pressure vessels, the intake hollow tube member 45 includes means (not shown) to connect with the product effluent from the outflow hollow tube insert member 44 of an upstream pressure vessel, while the outflow hollow tube insert member 44 includes means (not shown) for connecting the intake hollow tube insert member 45 with a downstream pressure vessel or another system of the ROWPU.

It is to be understood that the pressure simulator aperture 42 may be of smaller or larger diameters as may be necessary to approximate the drop in hydrostatic pressure observed when an actual reverse osmosis (RO) membrane or series of membrane units are replaced within the pressure vessel casings 18. It is to be further understood that more than one pressure simulator aperture 42 may be provided, such that each aperture is capable of being plugged by suitable means to simulate and adjust for variations in pressure drops of liquid flowing out of the outflow pipe stub 34. The diameter of one or more of apertures 42 may be varied to approximate the actual drop in pressure observed with an actual RO element in place. The pressure simulator aperture 42 may also be bored onsite at a remote field location. The variations of diameter and/or plurality of apertures provides flexibility and potentially greater accuracy to approximate a drop in pressure observed with an operating RO element.

Operation

It will be observed from the embodiment of FIGS.'s 3A and 5, during operation of the membrane simulating pressure vessel 10, liquid (usually water) passes into the pressure vessel 10 by means of the intake pipe stub 33, the path of flow being indicated by the arrows of FIG. 3A. The liquid passes through flow apertures 21 of the support members 14, and wherein most of the liquid will eventually pass out of the pressure vessel 10 by means of the outflow pipe stub 34. The hydrostatic pressure of the liquid passing through the outflow pipe stub 34 should approximate the hydrostatic pressure of effluent from an equivalent pressure vessel containing a conventional intact RO element. Pressurized liquid will be forced against the interior walls of the pressure vessel 10, against the outflow cap head 30 and to a lesser extent against the intake cap head 28. This liquid is forced back into the interior of pressure vessel 10 to cause a back pressure, illustrated by the curved arrows of FIG. 3A. The flow pressure will also cause liquid to pass through the pressure simulator aperture 42 and interiorly of the interior tube 20.

In the embodiment of FIG. 3A, after passing through the simulator aperture 42, the liquid will contact the deflector pipe 40, then around and in a direction toward the intake cap head 28, then into the deflector pipe 40, then passing through the outflow hollow tube insert member 44, and outwardly of the pressure vessel 10. When connected in series with other pressure vessels, the product liquid from an upstream pressure vessel travels directly into the interior tube 20 by means of the intake hollow tube insert member 45. When not in use, intake hollow tube insert member 45 is plugged by suitable means.

What is claimed is:

1. In a reverse osmosis water purification unit comprising an elongated, tubular pressure vessel arranged to contain at least one reverse osmosis membrane element, wherein the improvement comprises a membrane simulator for temporary substitution of said membrane element, said simulator comprising a tube member coaxially disposed and extending substantially the length of the pressure vessel and interior support means arranged to position and support the tube member in substantial coaxial alignment with the pressure vessel, wherein said tube member comprises means for lowering hydrostatic pressure of a liquid passing through the pressure vessel, which means simulates, in the absence of said membrane element, the decrease in hydrostatic pressure normally present when liquid passes through a reverse osmosis membrane element when said membrane element is normally disposed in the pressure vessel.

2. The purification unit of claim 1, wherein the internal support means comprises an integrally formed member including:
   a. an inner hub having an interior diameter dimensioned to receive the interior tube member,
   b. an outer rim having a polygonal periphery for receiving and supporting the inner diameter of the pressure vessel; and
   c. a plurality of radially projecting support spokes joining the hub and the outer rim.

3. The purification unit of claim 2, wherein the outer rim defines an equilateral triangular configuration.

4. The purification unit of claim 1, wherein the internal support means comprises an integrally formed member including:
   a. an inner hub having an interior diameter dimensioned to receive and support the interior tube member;
   b. an outer rim having an annular circumference approximating the inner diameter of the pressure vessel; and
   c. a plurality of radially projecting support spokes joining the inner hub and the outer rim.

5. The purification unit of claim 1, wherein the membrane simulator comprises separably coupling elements.

6. In the purification unit of claim 1, a reverse osmosis water membrane simulator comprising end cap members arranged to seal each end of the pressure vessel, each of the end cap members containing apertures, an aperture of one end cap member being arranged to allow for liquid intake and at least one aperture of the opposite end cap being arranged for liquid outflow from the pressure vessel.

* * * * *